United States Patent

Rendall et al.

Patent Number: 5,846,512
Date of Patent: *Dec. 8, 1998

[54] METHOD FOR PRODUCING ACTIVATED ALUMINA CATALYST

[75] Inventors: John S. Rendall; Massoud Ahghar; Stephen J. Lane, all of Albuquerque, N. Mex.

[73] Assignee: Solv-Ex Coporation, Albuquerque, N. Mex.

[*] Notice: This patent issued on a continued prosecution application filed under 37 CFR 1.53(d), and is subject to the twenty year patent term provisions of 35 U.S.C. 154(a)(2).

[21] Appl. No.: 760,344

[22] Filed: Dec. 4, 1996

Related U.S. Application Data

[63] Continuation-in-part of Ser. No. 459,832, Jun. 2, 1995, abandoned.

[51] Int. Cl.[6] .................................................. C01F 7/32
[52] U.S. Cl. ........................ 423/628; 423/625; 502/355
[58] Field of Search .................................. 423/625, 628, 423/551, 556; 502/355

[56] References Cited

U.S. PATENT DOCUMENTS

| | | | |
|---|---|---|---|
| 1,233,977 | 7/1917 | Cameron | 423/551 |
| 2,119,551 | 6/1938 | MacCarthy | 423/551 |
| 2,134,793 | 11/1938 | Mojjat | 423/551 |
| 2,402,471 | 6/1946 | Tuwiner | 423/551 |
| 3,647,372 | 3/1972 | Svoronos | 423/625 |
| 4,394,368 | 7/1983 | Shanks | 423/556 |
| 5,508,016 | 4/1996 | Yamanishi et al. | 423/625 |

FOREIGN PATENT DOCUMENTS

| | | | |
|---|---|---|---|
| 54-39358 | 11/1979 | Japan | 423/556 |
| 2013373 | 5/1994 | Russian Federation | 423/556 |
| 1761671 | 9/1992 | U.S.S.R. | 423/551 |

*Primary Examiner*—Ngoc-Yen Nguyen
*Attorney, Agent, or Firm*—Thomas E. Schatzel; Law Offices of Thomas E. Schatzel A Prof. Corporation

[57] ABSTRACT

A method of making activated alumina including the steps of dissolving a double salt of aluminum in a solution of pure water at 85° C., recrystalizing the double salt at a pressure about 250 psi and temperature ranging from 200° C. to 250° C., precipitating out the purified basic double salt, drying the precipitated double salt to drive off water and roasting it at 850° C. to 950° C. to drive off the sulfate, washing to remove the potassium sulfate and then drying the remaining alumina to yield activated alumina for use as a high-grade catalyst.

6 Claims, 1 Drawing Sheet

METHOD FOR PRODUCING ACTIVATED ALUMINA CATALYST

The application is a continuation-in-part of Ser. No. 08/459,832 filed on Jun. 2, 1995, now abandoned.

BACKGROUND OF THE INVENTION

1. Field of the Invention

The invention relates generally to inorganic chemistry and specifically to methods for producing high-grade alumina for catalytic applications.

2. Description of the Prior Art

Aluminum oxide (alumina) occurs abundantly in nature, most often as impure hydroxides, e.g., as in bauxites and laterites. Major chemical products are made by purifying such natural ores. Most bauxite is refined by the Bayer process which uses caustic additions to remove impurities and to produce a nominal 99.5% $Al_2O_3$ product with $Na_2O$ as its dominant impurity. (According to Charles M. Marstiller, Aluminum Company of America ALCOA.) About 90% of alumina is used in the production of aluminum metal. The rest is consumed in other applications, including activated aluminas.

Activated aluminas are widely used in adsorption and catalysis where their relatively large surface areas, pore structure and surface chemistry play important roles. Hydrated aluminas, those with water, are dehydrated by controlled heating. The oldest commercial form, still in wide use, is made from Bayer alpha-trihydrate. Activated bauxites have similar properties to the activated alumina from the Bayer alpha-trihydrate. They are obtained by thermal activation of bauxite containing alumina in the form of gibbsite. Another type of activated alumina is obtained by very rapid activation of Bayer hydrate at 673°–1073° K. The outcome is essentially amorphous alumina with a weak pattern of γ/η-alumina. Alumina gels also serve as starting points for the manufacture of activated aluminas. These gels are prepared from solutions of $Al_2(SO_4)_3$ and produce corresponding by-product salts that precipitate out after being washed.

Activated aluminas find important applications as catalysts. Sometimes the $Na_2O$ content is reduced to under one-tenth of one percent by washing in acidified water. Preparations using refined Al or an alkoxide of Al can be used to make an extremely pure activated alumina gel. But the manufacturing costs of these high-purity aluminas are very high.

The catalytic reactivity of activated alumina is represented by its theoretical number of available active sites. The surfaces contain hydroxyl groups, oxides and aluminum ions. The three basic catalytic sites also have many possible logistical combinations.

A major catalytic application of activated alumina is that of Claus converters, which recover sulfur (S) from $H_2S$ that has been extracted from sour natural gas or refinery off-gas. The dehydration of alcohols is one of the oldest catalytic reactions. Activated alumina can initiate synthesis in which water may be the reactant or the product. Bulk $MoO_3$ is industrially reduced to metal at 773° K. with $H_2$, but when supported on activated alumina, the reaction proceeds only to $MoO_2$. One of the largest modern-day uses of activated alumina is that of a catalyst support for catalytic mufflers on automobiles. The catalyst is a blend of Pt and Pd metals supported on pellets or a monolithic form. The Pt-Pd is used as an oxidation catalyst to convert hydrocarbons and CO to $CO_2$ and $H_2O$.

Poisons to the active sites of activated alumina catalysts were thought by most to comprise the naturally occurring impurities of potassium (K) and sodium (Na). The present inventors have discovered that potassium (K) is not necessarily a catalytic poison, especially when present in only small residual quantities.

SUMMARY OF THE PRESENT INVENTION

It is therefore an object of the present invention to provide a process for making activated alumina from a double salt of aluminum potassium sulphate material $(Al_2K_2(SO_4)_4 \cdot 24H_2O)$.

It is a further object of the present invention to provide a process for making high-grade activated alumina at economic prices.

Briefly, in a preferred method embodiment of the present invention, a "double salt" of $KAl(SO_4)_2 \cdot 12H_2O$ as a feedstock, includes the steps of dissolving the double salt in a solution of pure water at 85° C., recrystalizing the double salt at a pressure of 250 psi by evaporation at a temperature of 65° C., raising the temperature of the recrystallized double salt to 95° C., adding water, precipitating a basic double salt at 200° C. and 250 psi, drying the precipitated double salt to drive off water and roasting it at 850° C.–950° C. to drive off the sulphate, washing to remove the potassium sulphate and then dehydrating the remaining alumina to yield activated alumina for use as a high-grade catalyst.

An advantage of the present invention is that a method is provided for making activated alumina that has a catalytic activity in the range of $1.4 \times 10^{-6}$ to $1.7 \times 10^{-6}$ mole/gm/s at 175° C.

A further advantage of the present invention is that a method is provided for making alumina inexpensively.

Another advantage of the present invention is that a method is provided for producing fine-particles of $Al_2O_3$ that have surface areas exceeding Brunauer-Emmett-Teller (BET) surface area data of 120 $m^2/g$ and have highly active acid sites for catalyst use.

These and other objects and advantages of the present invention will no doubt become obvious to those of ordinary skill in the art after having read the following detailed description of the preferred embodiments that are illustrated in the various drawing figures.

IN THE DRAWINGS

FIG. 1 is a diagram of both an eight-step and a six-step method for producing activated alumina in first and second embodiments of the present invention that can share the same first three steps.

DETAILED DESCRIPTION OF THE PREFERRED EMBODIMENTS

Figure 1:
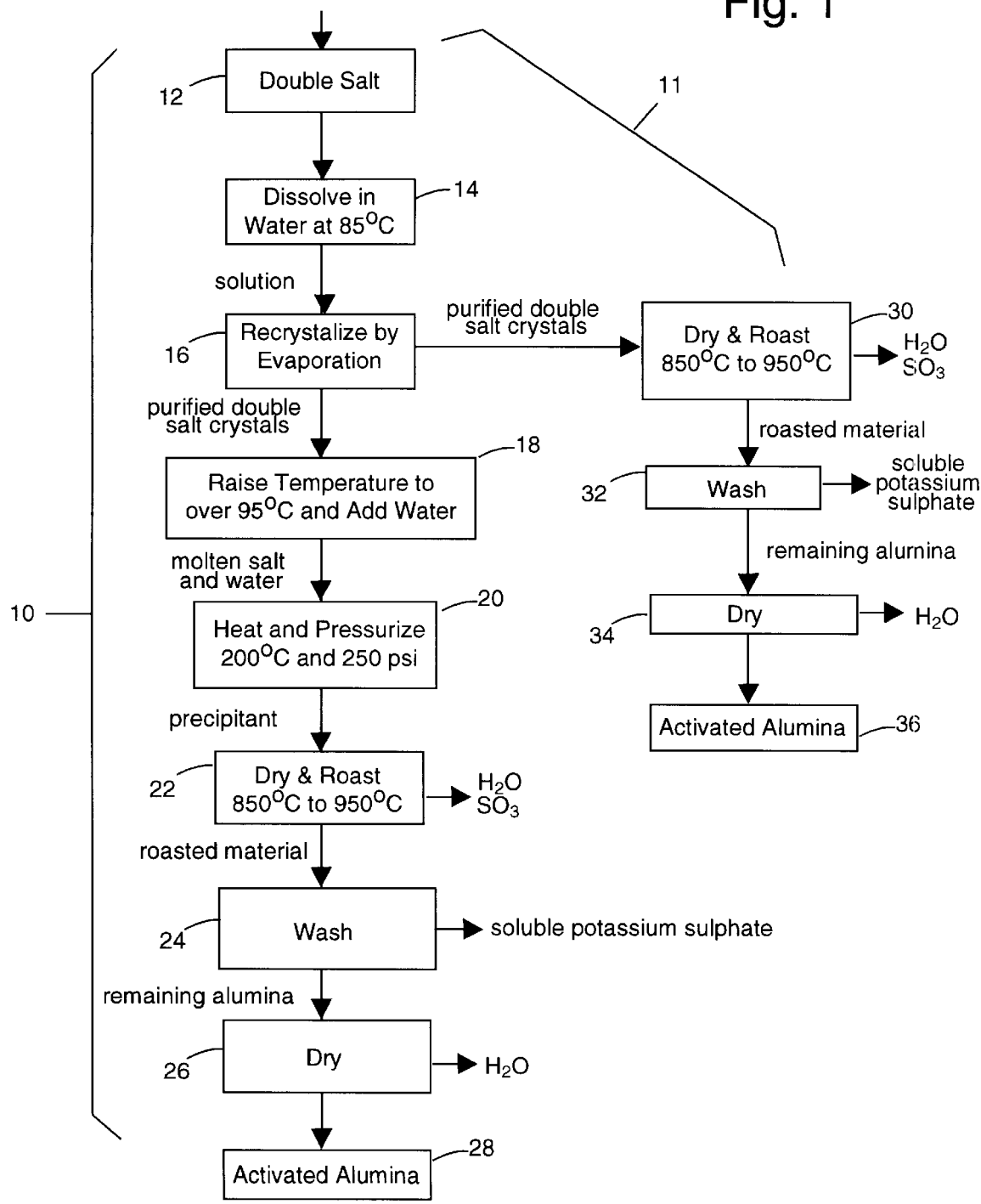

FIG. 1 illustrates a combined first and second method embodiment of the present invention for making activated alumina powders from double salts, referred to herein by the general reference numeral 10. Such alumina powder has a mean particle size of eight microns. The combined first and second methods 10 and 11 begin with a double salt of potassium or aluminum sulphate 12 that is dissolved in solution with pure water and is heated to about 85° C. in a step 14. Such double salts 12 may be sourced from a leach liquor, e.g., as described in U.S. Pat. No. 5,387,276, issued Feb. 7, 1995, and U.S. Pat. No. 5,124,008, issued Jun. 23, 1992, both of which are incorporated herein by reference. Such leach liquors may be purified prior to use in the step 14 by a one or two stage crystallization process. The two-stage purification is preferred, in that it creates 99.5% pure double salts. Industrial quantities of similar materials are commercially available from a number of common sources that employ conventional processes. The constituents $Al_2O_3$, $3H_2O$, $H_2SO_4$ and KOH may also be used as a starter material mix. Presently, it is unknown what the effects are of varying the purity of the starter materials introduced at the step 12 on the activity coefficient of the final activated alumina powder.

A step 16 obtains a purified double salt from the solution by recrystallizing the double salt at a nominal temperature of 65° C. by evaporation. Such recrystallized crystals of the double salt are then easily precipitated out of solution to remove impurities. The method 10 continues with a step 18 that provides a molten salt at greater than 95° C. to which hot water is added. In a step 20, the basic double salt solution is precipitated by increasing the temperature to a nominal range of 200° C. to 250° C. and the pressure to a nominal of 250 psi. In a step 22, drying drives off the $H_2O$ and roasting drives off the $SO_3$. Roasting involves raising the temperature to 850° C. to 950° C. for a sufficient time. For example, 900° C. for twenty to thirty minutes. A step 24 uses pure water to wash out the soluble potassium sulphate. A step 26 dries the remaining alumina to yield an activated alumina 28 in powder form. Such alumina powder 28 has been tested for catalytic activity, and indicates an activity coefficient of $1.4 \times 10^{-6}$ mole/gm/s at 175° C.

Aluminum sulphate can be produced from bauxite clays or aluminum hydrate by the addition of sulfuric acid. Crystallization from leach liquor and recrystallization produces pure aluminum sulphate crystals. Redissolving and then precipitating of the basic aluminum sulphate at 200° C. to 250° C. provides basic aluminum sulphate crystals. These are roasted to remove the $SO_3$ and the resulting activated alumina has highly reactive acid sites available on the alumina. Chemically,

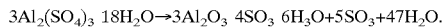

$$3Al_2(SO_4)_3 \cdot 18H_2O \rightarrow 3Al_2O_3 \cdot 4SO_3 \cdot 6H_3O + 5SO_3 + 47H_2O.$$

A preferred embodiment includes the production of the double salt of potassium/aluminum sulphate. By addition of sulfuric acid to bauxite or clays of aluminum hydrate, a leach liquor can be produced. This is then treated with potassium sulphate to precipitate crystals of the double salt which may be recrystallized once or twice for greater purity. Redissolution and precipitation of the double salt at around 200° C. to 250° C. provides crystals which are then roasted to remove the $SO_3$. Washing removes the potassium sulphate and leaves highly reactive acid sites available on the alumina. In summary,

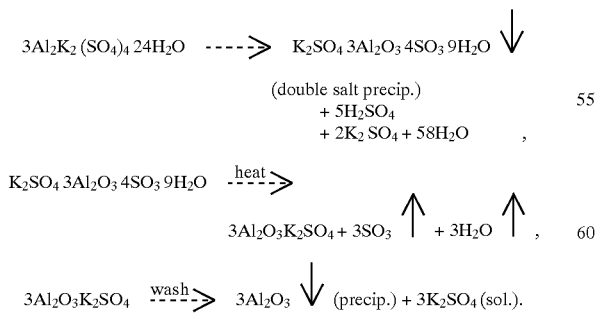

The resulting dried powders of $Al_2O_3$ have Brunauer-Emmett-Teller (BET) surface area exceeding 120 m²/g and have highly active acid sites for catalyst use.

The second method 11 repeats the first three steps, steps 12, 14, and 16 and then branches to a set of three more steps 30, 32 and 34, which results in an activated alumina 36.

In the step 30, the start materials, e.g., the double salts recrystallized by evaporation in the step 16, are dried and roasted. The drying and roasting step 30 is equivalent to that of step 22 in the method 10. However, during the drying, the hydrated double salts have to be carefully dehydrated as the material dissolves in its own waters of hydration. Raising the double salts to a temperature of 92° C. for as long as the water needs to be removed should prove to be acceptable. Once the material is no longer a hydrate, the roasting temperatures will not cause a problem. The step 32 uses pure water to wash out the soluble potassium sulphate. A step 34 dehydrates the remaining alumina to yield the activated alumina 36 in powder form. Such alumina powder 36 has been tested for catalytic activity, and indicates an activity coefficient exceeding $1.4 \times 10^{-6}$ mole/gm/s at 175° C.

Method 10 eases the problem of drying the double salts before roasting, Since there is a large amount of water that must be removed, the step 32 is more difficult than the step 16 and must be done with great care, e.g., by spray drying.

The method 10 is less costly compared to the method 11 in that it requires less heating energy, e.g., for drying. The step 20 removes 70% of the $H_2O$ and $SO_3$ for the step 22. But in the method 11, all the $H_2O$ and $SO_3$ is in the starting material, so large amounts of expensive energy are required for the drying and a larger sulfuric acid plant is needed to recycle the $SO_3$.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for producing activated alumina suitable for use as a catalyst, comprising the steps of:
   (a) dissolving a double salt of aluminum potassium sulfate $Al_2K_2(SO_4)_4$ in a solution;
   (b) heating and pressurizing the resulting solution in a pressure vessel to crystallize and precipitate out a crystal material from said solution;
   (c) drying and calcining said crystal material to produce a combination of alumina and potassium sulfate;
   (d) washing with water to remove said potassium sulfate from said combination of alumina and potassium sulfate; and
   (e) drying said alumina remaining after the step of washing to produce an activated alumina.

2. The method of claim 1, wherein:
   said double salt in the dissolving step (a) is obtained by purifying a first double salt of aluminum potassium sulfate, wherein said purifying comprises the steps of dissolving said first double salt in a solution of water to form a first solution and recrystallizing to obtain the double salt which is used in step (a) by subjecting the first solution to a temperature of 65° C.

3. The method of claim 1, wherein:
   the step of heating and pressuring includes precipitating said crystal material in said solution by adjusting a combination of solution concentration and solution temperature.

4. The method of claim 1, wherein:

the step of heating and pressuring includes heating said solution obtained from step (a) to a temperature in the range of about 200° C. to 250° C. and a pressure of about 250 psi.

5. The method of claim 1, wherein:

the step of drying and calcining includes drying said crystal material with a heat of more than 200° C. to drive off the water and then calcine roasting at a temperature of 850° C. to 950° C., wherein a combination of alumina and potassium sulphate remains.

6. A method of making activated alumina including the steps of:

dissolving a double salt of aluminum potassium sulfate $Al_2K_2(SO_4)_4$ in a solution of water at 85° C.;

recrystallizing a double salt of aluminum potassium sulfate by subjecting said solution to a temperature of 65° C.;

removing said double salt of aluminum potassium sulfate recrystallized in the preceding step and adding water to said recrystallized double salt;

increasing the pressure applied to said double salt and added water to approximately 250 psi and increasing the temperature to 200° C. to 250° C.;

precipitating out a purified material from said heated and pressurized double salt and added water;

drying said purified material precipitated in the previous step to drive off water and roasting it at 850° C.–950° C. to drive off $SO_3$;

washing said dried and calcined purified material with water to remove soluble potassium sulfate, thereby forming an alumina product; and drying said alumina product to yield a catalyst form of activated alumina.

* * * * *